(12) United States Patent
Chavannavar

(10) Patent No.: US 8,974,738 B2
(45) Date of Patent: Mar. 10, 2015

(54) SYSTEM AND METHOD FOR EXHAUST GAS AFTER TREATMENT

(71) Applicant: Caterpillar Inc., Peoria (IL)

(72) Inventor: Praveen S. Chavannavar, Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/282,534

(22) Filed: May 20, 2014

(65) Prior Publication Data

US 2014/0255281 A1   Sep. 11, 2014

Related U.S. Application Data

(62) Division of application No. 13/456,806, filed on Apr. 26, 2012, now Pat. No. 8,765,623.

(51) Int. Cl.
| | |
|---|---|
| *B01D 50/00* | (2006.01) |
| *B01D 53/94* | (2006.01) |
| *B01J 38/10* | (2006.01) |
| *B01D 53/56* | (2006.01) |
| *B01D 53/72* | (2006.01) |
| *F01N 3/20* | (2006.01) |
| *F01N 13/00* | (2010.01) |
| *C01B 3/38* | (2006.01) |

(52) U.S. Cl.
CPC ............. *B01D 53/9431* (2013.01); *B01J 38/10* (2013.01); *B01D 53/56* (2013.01); *B01D 53/72* (2013.01); *F01N 3/2066* (2013.01); *F01N 3/208* (2013.01); *F01N 13/0093* (2013.01); *C01B 3/38* (2013.01); *F01N 2590/08* (2013.01); *F01N 2610/02* (2013.01); *F01N 2610/03* (2013.01); *F01N 2900/1404* (2013.01); *Y02T 10/24* (2013.01)
USPC ......................... 422/171; 423/235; 423/239.1

(58) Field of Classification Search
USPC ................................ 423/235, 239.1; 422/171
See application file for complete search history.

(56) References Cited

U.S. PATENT DOCUMENTS

| | | |
|---|---|---|
| 7,721,532 B2 | 5/2010 | Liu et al. |
| 7,797,932 B2 | 9/2010 | Herrick et al. |
| 7,908,846 B2 | 3/2011 | Tai |
| 7,926,263 B2 | 4/2011 | Stroh et al. |
| 8,765,623 B2 * | 7/2014 | Chavannavar ................ 502/45 |
| 2010/0251700 A1 | 10/2010 | Wan et al. |
| 2011/0011068 A1 | 1/2011 | Ren et al. |
| 2011/0036076 A1 | 2/2011 | Gonze et al. |
| 2011/0070134 A1 | 3/2011 | Stakhev et al. |

* cited by examiner

*Primary Examiner* — Edward Johnson
(74) *Attorney, Agent, or Firm* — Leydig, Voit & Mayer, Ltd.

(57) ABSTRACT

A hydrocarbon selective catalytic reduction (HC-SCR) catalyst is regenerated using a nitrogen-based reductant agent. The HC-SCR catalyst is in communication with a power system such as an internal combustion engine and receives exhaust gasses from the internal combustion engine. Sulfur in the exhaust gasses may deactivate the HC-SCR catalyst by sulfur oxides forming thereon. To remove the sulfur oxides, a nitrogen-based reductant agent is introduced to the exhaust gasses. The nitrogen-based reductant agent decomposes to nitrogen oxides and hydrogen. The hydrogen reacts with the sulfur oxides to form hydrogen sulfides thereby removing the sulfur oxides from the HC-SCR catalyst.

14 Claims, 2 Drawing Sheets

SYSTEM AND METHOD FOR EXHAUST GAS AFTER TREATMENT

CROSS-REFERENCE TO RELATED APPLICATION

The present application is a divisional and claims the benefit of co-pending U.S. patent application Ser. No. 13/456,806, filed on Apr. 26, 2012, the complete disclosure of which is hereby incorporated by reference herein in its entirety for all purposes.

TECHNICAL FIELD

The present disclosure relates generally to an exhaust treatment system for reducing pollution emitted by a power system such as an internal combustion engine, and more particularly, to a system and method for regenerating a selective catalytic reduction system used to reduce nitrogen oxides in exhaust gasses.

BACKGROUND

A byproduct of internal combustion engines, including diesel engines, are various emissions such as nitrogen oxide emissions including NO and $NO_2$, sometimes represented as $NO_X$. In response to increased government-mandated regulations over such emissions, manufacturers of internal combustion engines have developed measures to reduce the amount or effect of the nitrogen oxides produced by the internal combustion process. Two such measures are described in U.S. Patent Application Publication No. 2011/0022068 (the '068 publication).

The '068 publication describes selective catalytic reduction (SCR) methods in which the quantity of nitrogen oxides in the exhaust gasses are reduced through chemical reactions that occur in the presence of a catalyst disposed in the exhaust system. In a typical SCR process, a reductant agent is introduced to the exhaust gasses generally upstream of the catalyst whereat the reductant agent and nitrogen oxides react to convert the nitrogen oxides to other chemicals such as nitrogen ($N_2$) and water ($H_2O$).

Hydrocarbons are one common type of reductant agent that may be used to perform selective catalytic reduction. In some embodiments, the hydrocarbons can be conveniently obtained from the same fuel source used by the internal combustion engine, thereby simplifying the SCR system. However, the specific catalytic materials typical used to perform Hydrocarbon Selective Catalytic Reduction (HC-SCR) can be susceptible to deactivation due to sulfur in the exhaust gasses, which may form sulfur oxides on the catalytic material thereby reducing the number of active sites available on the catalyst to initiate conversion of the nitrogen oxides. To remedy sulfur deactivation, the HC-SCR catalyst may be occasionally regenerated by heating the catalyst with, for example, a burner to sufficiently high temperatures such that sulfur oxides are removed from the catalytic material. Temperatures required for regeneration, however, are high, possibly greater than 600° C., and may reduce the catalyst life and fuel efficiency of the internal combustion system.

Nitrogen-based selective catalytic reduction (N-based SCR) is another SCR method that uses a nitrogen-based reductant agent such as ammonia ($NH_3$) or urea. The nitrogen-based reductant agent must be stored in a separate storage tank and must be occasionally replenished. Hence, N-based SCR systems lack the simplicity of HC-SCR systems and require the internal combustion engine operator to monitor and replenish another material consumed in the internal combustion process. Moreover, the nitrogen-based reductant agent may be relatively more expensive and less readily available than the fuel that can be used as a hydrocarbon reductant agent.

SUMMARY

The disclosure describes, in one aspect, a method of regenerating a hydrocarbon selective catalytic reduction (HC-SCR) catalyst for the selective catalytic reduction of exhaust gasses. The method includes providing an HC-SCR catalyst in communication with an internal combustion engine and directing the exhaust gasses from the internal combustion engine to the HC-SCR catalyst. The exhaust gasses may include hydrocarbons and sulfurs. The HC-SCR may become deactivated by depositing sulfur oxides thereon. The method further includes introducing a nitrogen-based reductant agent to the exhaust gasses and decomposing the nitrogen-based reductant agent to nitrogen oxides and hydrogen. According to the method, at least a portion of the sulfur oxides are removed from the HC-SCR catalyst by converting the sulfur oxides and the hydrogen to hydrogen sulfides.

In another aspect, the disclosure describes a selective catalytic reduction system for use with a power system such as an internal combustion engine. The selective catalytic reduction system may be associated with an exhaust system in fluid communication with the power system that directs exhaust gasses from the power system to the environment. The system includes a hydrocarbon selective catalytic reduction (HC-SCR) catalyst for hydrocarbon selective catalytic reduction disposed in the exhaust system. The HC-SCR catalyst includes a catalytic material for reducing a portion of nitrogen oxides present in the exhaust gasses. The system also includes a nitrogen-based agent storage tank for storing a nitrogen-based reductant agent and a nitrogen-based agent injector in fluid communication with the nitrogen-based agent storage tank. The nitrogen-based agent injector may be disposed in the exhaust system upstream of the HC-SCR catalyst to inject the nitrogen-based reductant agent into the exhaust system.

In yet another aspect, the disclosure describes another method of reducing pollutants in exhaust gasses from a combustion-based power system. The method includes directing the exhaust gasses from the power system via an exhaust system through a hydrocarbon selective catalytic reduction (HC-SCR) catalyst for hydrocarbon selective catalytic reduction. The method reduces a portion of nitrogen oxides present in the exhaust gasses via the HC-SCR catalyst. Periodically, the method also introduces a nitrogen-based reductant agent into the exhaust system upstream of the HC-SCR catalyst to remove sulfur oxide deposits from the HC-SCR catalyst.

BRIEF DESCRIPTION OF THE DRAWING(S)

DETAILED DESCRIPTION

Figure 1:
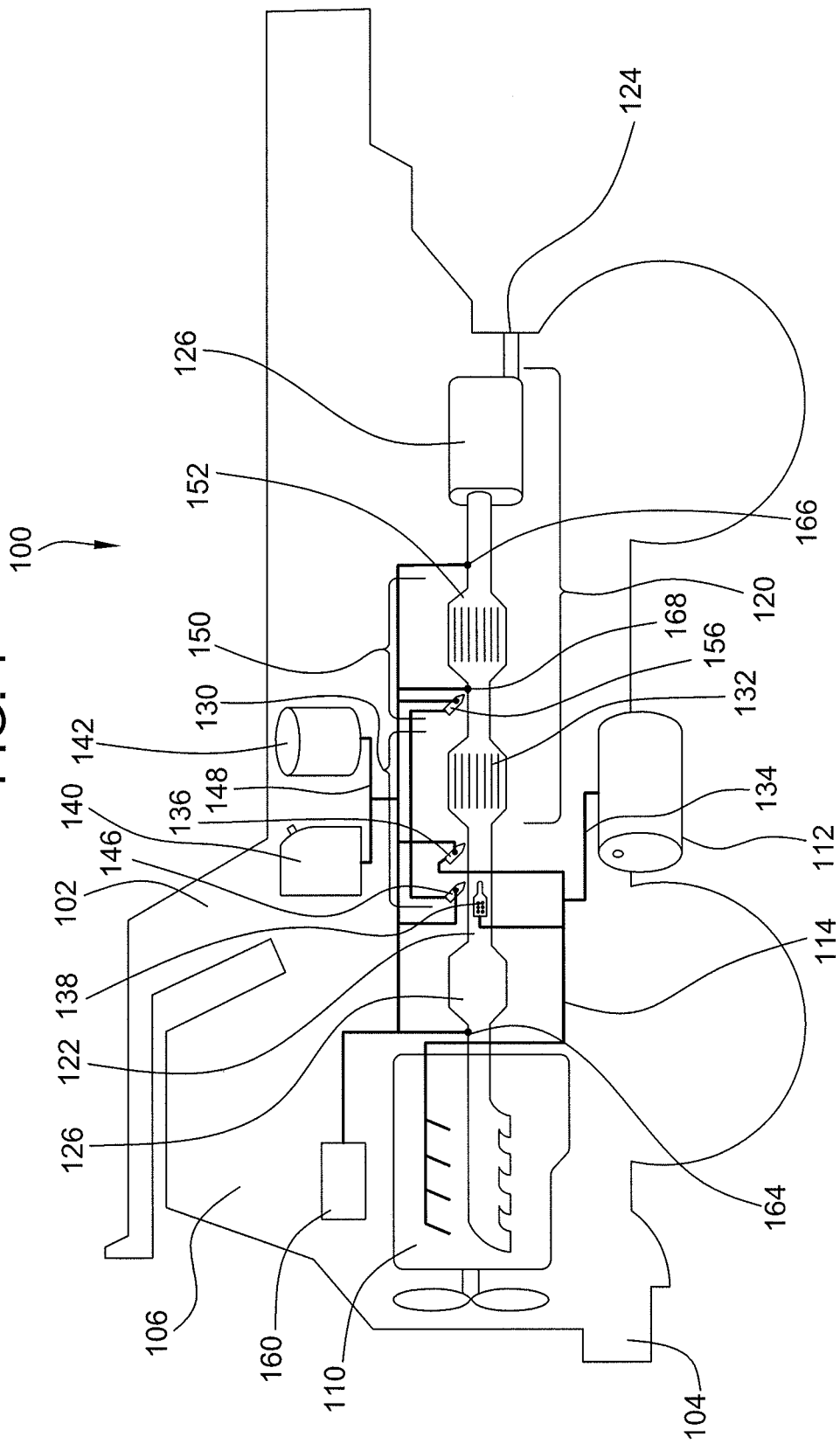
FIG. 1 is a diagrammatical illustration representing a machine having an internal combustion engine in communication with an exhaust system and a selective catalytic reduction system associated with the exhaust system for reducing nitrogen oxides in the exhaust gasses.

The present disclosure relates to systems and methods for reducing nitrogen oxides in the exhaust gasses produced by a power system such as an internal combustion engine, and more specifically to ways of periodically regenerating the components responsible for reducing the nitrogen oxides. Referring to FIG. 1 (wherein like reference numbers refer to like elements) there is illustrated a machine 100 equipped with a power system 110 in the form of an internal combustion engine and more particularly in the form of a diesel engine. However, the present disclosure contemplates any suitable power system including gasoline engines, natural gas engines, propane-based engines, and coal-burning systems. Likewise, although the illustrated machine 100 is a dump truck having a dump body 102 on a support frame 104 and an operator's cab 106 from where the various machine controls can be accessed, the present disclosure contemplates any type of vehicular machine that utilizes such power systems for powering motion or operation of working implements. The disclosure also contemplates power systems that can be used in stationary applications such as electric generators, pumps and compressors.

As is known in the art, power systems 110 such as internal combustion engines convert the potential energy stored in the fuel source into mechanical energy that can perform mechanical work or can be otherwise utilized. To supply the power system 110 with fuel, which is typically a fluid, the machine 100 can include a fuel tank 112 that is in fluid communication with the power system via a first fuel supply line 114. To direct the exhaust gasses produced by the internal combustion process away from the power system 110, the machine 100 can also include an exhaust system 120. The power system 110 and exhaust system 120 can be supported by or accommodated in the support frame 104 of the machine 100.

The exhaust system 120 may include an exhaust pipe or an exhaust channel 122 that is disposed through the machine 100 and which terminates at an exhaust orifice 124 where the exhaust products are discharged to the environment. Although the illustrated embodiment depicts the exhaust channel 122 as an elongated conduit extending the length of the machine 100, it will be appreciated that the exhaust channel can have any suitable size, shape or arrangement depending upon the application employing the power system 110. To reduce the impact the exhaust gasses may have on the environment or the health of humans and animals, the exhaust system 120 may include various after-treatment devices 126 that remove or convert the harmful exhaust byproducts before they enter the environment. Such devices are referred to as after-treatment devices because they operate or function after the exhaust products have been created and discharged from the power system 110, and thus are distinguishable from fuel formulations and other pre-combustion measures. The after-treatment devices 126 can include particulate filters, catalytic convertors, and mufflers for reducing noise pollution.

As described above, a particular type of after-treatment device that may be associated with the exhaust system 120 is a hydrocarbon selective catalytic reduction (HC-SCR) system 130. The HC-SCR system 130 includes an HC-SCR catalyst 132 located downstream of the power system 110 that can cause reaction between the exhaust gasses and a hydrocarbon reduction agent to reduce the amount of nitrogen oxides in the exhaust gasses. The reaction may generally take place according to the following equation:

$$HC+NO_X=N_2+CO_2+H_2O \tag{1}$$

To supply hydrocarbon reductant agent, which may be the same fuel used by the power system 110, the HC-SCR system 130 can include a second fuel supply line 134 that accesses, directly or indirectly, the fuel tank 112 and communicates with an HC-SCR injector 136. In other embodiments, the hydrocarbon reductant agent can be obtained from a supply reservoir distinct from the fuel tank 112. To introduce the hydrocarbon reductant agent to the exhaust gasses, the HC-SCR injector 136 can be partially disposed in or otherwise access the exhaust channel 122 generally upstream of the HC-SCR catalyst 132. The HC-SCR injector 136 can be directed toward the HC-SCR catalyst 132 and, in various embodiments, can direct the hydrocarbon reductant agent through a mixer or baffle to assist intermixing of the exhaust gasses and reductant agent prior to entry into the HC-SCR catalyst. In other embodiments, the HC-SCR injector can be disposed in or proximate to the HC-SCR catalyst and directly inject into the HC-SCR catalyst. The HC-SCR injector 136 can be an electro-mechanical device, such as a solenoid operated valve or the like, that can be selectively activated and deactivated to selectively introduce or inject a quantity or volume of hydrocarbon reductant agent. In other embodiments, methods other than injection can be used to introduce the hydrocarbon reductant agent to the exhaust gasses, such as evaporation from reservoirs or wicks. The quantity of hydrocarbon reductant agent introduced may be determined based upon the operating conditions of the power system 110 and the amount of nitrogen oxides that are to be reduced. The process of introducing or injecting reductant agent into the exhaust gasses is sometimes referred to as "dosing."

The HC-SCR catalyst 132 may include an internal structure, such as a honeycomb frame or baffles, made of a material that initiates the chemical reaction that reduces the nitrogen oxides in the exhaust gasses. Examples of materials suitable for the HC-SCR catalyst include silver-based materials such as silver tungstate. As described above, during operation, the HC-SCR catalyst may become partially or wholly deactivated by exposure to sulfur in the exhaust gasses passing through it. The sulfur may collect on and form sulfur oxides on the active sites over the surface of the HC-SCR catalytic materials thereby lowering the efficiency of the HC-SCR catalyst 132 in reducing nitrogen oxides. To regenerate the HC-SCR catalyst 132, a burner 138 can be disposed in the exhaust channel 122 that directs a flame or heated gasses toward the HC-SCR catalyst to raise the temperature therein such that the sulfur oxides are removed from the HC-SCR catalytic material.

The HC-SCR system 130 may also be configured to introduce or dose a nitrogen-based reductant agent to the HC-SCR catalyst 132. Any suitable nitrogen-based reductant agent can be used including for example, liquid or solid ammonia or solid ammonia solution, or urea. To provide the nitrogen-based reductant agent such as liquid ammonia or urea, the machine 100 can include a liquid nitrogen-based agent storage tank 140. In other embodiments in which solid ammonia or a solid ammonia-based material is used as the nitrogen-based reductant agent, the machine can include a solid nitrogen-based agent storage tank 142 that can be configured to sublimate the solid ammonia-based material to a fluid state. The nitrogen-based reductant agent can be introduced to the exhaust gasses by a nitrogen-based agent injector 146 disposed into or accessing the exhaust channel 122. The nitrogen-based agent injector 146 can be positioned upstream of the HC-SCR catalyst 132 either before or after the HC-SCR injector 136. In other embodiments, the nitrogen-based agent injector can be disposed in or proximate to the HC-SCR catalyst and directly inject into the HC-SCR catalyst. The nitrogen-based agent injector 146 can also be similar in construction and operation to the HC-SCR injector 136. A nitrogen-based reductant agent supply line 148 can establish fluid communication between the liquid or solid nitrogen-based agent storage tanks 140, 142 and the nitrogen-based agent injector 146.

To further facilitate reduction of nitrogen oxides in the exhaust gasses, in an optional embodiment, a nitrogen-based selective catalytic reduction (N-based SCR) system 150 that utilizes nitrogen-based reductant agent can be associated with the exhaust system 120. The N-based SCR system 150 can include an N-based SCR catalyst 152 disposed in the exhaust channel 122, for example, downstream of the HC-SCR system 130 and of the power system 110. The N-based SCR system 150 can also include an N-based SCR injector 156 to direct nitrogen-based reductant agent to the N-based SCR catalyst 152. The N-based SCR injector 156 can be in fluid communication with the liquid and/or solid nitrogen-based agent storage tanks 140, 142 via the nitrogen-based reductant agent supply line 148. In other embodiments, the N-based SCR injector 146 can receive nitrogen-based reductant agent from a different supply or of a different formulation than the nitrogen-based reductant agent used by the HC-SCR system 130. The nitrogen-based reductant agent, such as ammonia ($NH_3$), can react with and reduce the nitrogen oxides among the exhaust gasses in the presence of the N-based SCR catalyst 152, for example, according to the following representative equation:

$$NH_3 + NO_X = N_2 + H_2O \qquad (2)$$

To control operation of the exhaust system 120 and the associated HC-SCR system 130 and N-based SCR system 150, the machine 100 can have an electronic control unit, module or controller 160 onboard. The controller 160 can include a microprocessor or other appropriate circuitry and can have memory or data storage capabilities. Although in FIG. 1, the illustrated controller 160 is represented as a single, discrete unit, in other embodiments the controller and its functions may be distributed among a plurality of distinct and separate units. In addition to controlling the SCR systems, the controller 160 can be tasked with controlling various other systems and processes associated with the machine. With respect to the exhaust system 120, the HC-SCR system 130 and, when present, the N-based SCR system 150, the controller 160 can be communicatively linked to and can control operation of the HC-SCR injector 136, the nitrogen-based agent injector 146, and the N-based SCR injector 156.

To receive information regarding the exhaust system 120 and the ongoing SCR processes that may be associated with the exhaust system, the controller 160 can be communicatively linked with various sensors and instruments disposed about the machine 100. For example, the controller 160 can communicate with an upstream sensor 164 that can monitor the characteristics of the exhaust gasses as they exit the power system 110 before they are treated through the HC-SCR system 130. The upstream sensor 164 can therefore determine the initial content or concentration of nitrogen oxides in the exhaust gasses. The controller 160 can also communicate with a downstream sensor 166 that can monitor nitrogen oxides in the exhaust gasses after treatment through at least the HC-SCR system 130 and possibly the N-based SCR system 150. In certain embodiments including those having an N-based SCR system 150, the controller 160 can also communicate with a midstream sensor 168 disposed in the exhaust channel 120 between the HC-SCR system 130 and the N-based SCR system.

Figure 2:
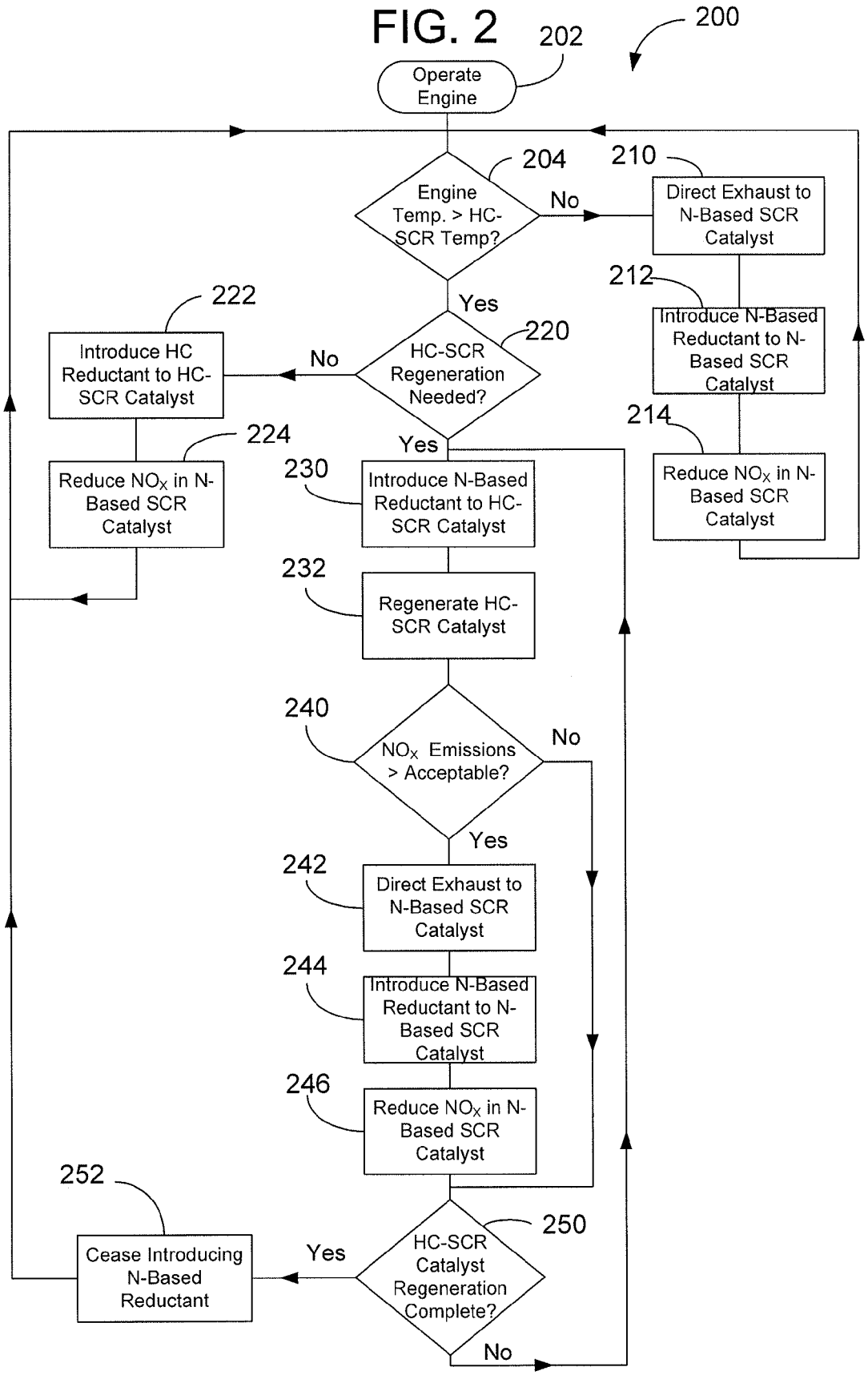
FIG. 2 is a schematic flow chart representing various possible routines or steps that may be conducted to perform selective catalytic reduction in accordance with the disclosure.

To control or direct operation of the HC-SCR system 130 and the N-based SCR system 150, the controller 160 can be configured with non-transitory logic or software that can process or perform among other things a series of input steps, decision steps, instructions steps, command steps, directive steps or output steps. For example, referring to FIG. 2, there is illustrated a schematic flowchart 200 representing possible routines, steps or decisions the controller 160 may perform or execute to control the SCR systems. It will be appreciated that the flowchart illustrated in FIG. 2 is a representative embodiment of the control process or processes only and that any reflection or indication of an actual order of steps, software routines or modules, or algorithms are not a limitation of the claims. Further, it is contemplated that any number of steps can be combined, separated, introduced or eliminated.

In an initial operation step 202, the power system, such an internal combustion engine on a machine as described, may be started and running, accordingly producing exhaust gasses. In those embodiments in which an N-based SCR catalyst is associated with the power system, the controller may execute an optional decision step 204 to determine if the engine and exhaust conditions are better suited for conducting HC-SCR processing or treatment or N-based SCR processing or treatment. For example, HC-SCR processing typically must be performed at higher temperatures than N-based SCR processing. To account for this and in conjunction with the decision step 204, the controller can use the sensors to measure or sense the exhaust temperature either directly or indirectly by, for example, measuring engine load. Based on the measured or sensed values, the controller in the decision step 204 can determine and select whether to perform HC-SCR processing or N-based SCR processing of the exhaust gasses.

If the decision step 204 selects N-based SCR processing, the controller in an instruction step 210 can direct that the exhaust gasses be directed to the N-based SCR catalyst, possibly without any intervening processing or treatment. In an introducing step 212, the controller can direct that nitrogen-based reductant agent is introduced into the exhaust channel upstream of or directly into the N-based SCR catalyst. This series of steps executed by the controller results in a reduction step 214 in which the nitrogen oxides in the exhaust gasses are reduced by reaction with the nitrogen-based reductant agent in the N-based SCR catalyst, for example, in accordance with equation (2) above. The controller can return to the decision step 204 to reassess and/or reselect HC-SCR processing or N-based SCR processing based on new engine and/or exhaust conditions.

If the controller in decision step 204 determines that the conditions are appropriate for HC-SCR processing, the controller may next determine in another decision step 220 whether the HC-SCR catalyst is in suitable condition for performing HC-SCR processing of the exhaust gasses or whether it has been deactivated by sulfur or sulfur oxides and should be regenerated. This determination can be accomplished by, for example, using the upstream sensor 164 and downstream sensor 166 illustrated in FIG. 1 to measure and compare the concentration or quantity of the nitrogen oxides entering the HC-SCR catalyst 132 with the concentration or quantity of nitrogen oxides exiting the HC-SCR catalyst during HC-SCR processing. From this information, the controller can determine or calculate the efficiency or effectiveness of the HC-SCR catalyst 132. Thus, the controller in decision step 220 can determine whether the HC-SCR catalyst needs regeneration.

If the decision step 220 determines the HC-SCR catalyst is operable, the controller can direct that HC-SCR processing occur. For example, referring to FIGS. 1 and 2, in an introducing step 222, the controller can direct that the HC-SCR injector 136 introduce hydrocarbon reductant agent to the exhaust gasses, for example, into the exhaust channel 122 upstream of HC-SCR catalyst 132 or directly into the HC-SCR catalyst. Execution of this series of steps results in a reduction step 224 in which nitrogen oxides present in the exhaust gasses are reduced via reaction with the hydrocarbon reductant agent in the HC-SCR catalyst 132, for example, according to equation (1) above. The controller can occasionally return to decision step 204 to reassess whether HC-SCR or N-based SCR processing are appropriate for the engine and/or exhaust conditions and can return to decision step 220 to reassess whether the HC-SCR catalyst should be regenerated.

If the controller in decision step 220 determines that regeneration is required, the controller can direct or execute steps to regenerate the HC-SCR catalyst utilizing the nitrogen-based reductant agent. For example, referring to FIGS. 1 and 2, the controller can execute an introducing step 230 directing the nitrogen-based agent injector 146 to introduce nitrogen-based reductant agent, either into the exhaust channel 122 upstream of or directly into the HC-SCR catalyst 132. Next, in a regenerating step 232, the controller can undertake or direct regeneration of the HC-SCR catalyst to remove the sulfur or sulfur oxide deposits on the catalyst material. If it is desired to raise the temperature of the HC-SCR catalyst for regeneration, the controller can activate the burner 138 disposed in the exhaust channel 122.

During the regenerating step 232, the nitrogen-based reductant agent such as ammonia with the chemical formula $NH_3$ may decompose to produce nitrogen oxide and hydrogen, for example, according to the following representative equation:

$$NH_3 = NO_x + H_2 \qquad (3)$$

Although this reaction has the apparent disadvantage of generating nitrogen oxides, it advantageously increases the quantity or concentration of hydrogen relative to oxygen in the exhaust gasses. The conditions in the HC-SCR catalyst may be referred to as "rich" in that the relative oxygen concentration is low. Under these conditions, the sulfur or sulfur oxides deposited on the HC-SCR catalyst materials may combine more readily with the hydrogen, in part due to the relative lack of oxygen, to form hydrogen sulfides or similar compounds, for example, according to the following equation:

$$H_2 + SO_x = H_2S + O_2 \qquad (4)$$

The sulfur oxides deposited or formed on the HC-SCR catalyst 132 are thereby removed as hydrogen sulfides. In a further embodiment, the hydrogen sulfides can be trapped or filtered from the exhaust gasses before discharge to the environment.

To reduce the effect of the associated production of nitrogen oxides during regeneration of the HC-SCR catalyst 132 with the nitrogen-based reductant agent, it is possible that the controller regenerate the HC-SCR catalyst only intermittently, for example, every 100 hours of engine operation. Furthermore, in another optional process available with those embodiments that include an N-based SCR system, the controller can be configured to direct additional N-based SCR processing of the exhaust gasses. For example, referring to FIGS. 1 and 2, in another decision step 240, the controller using information from the downstream sensor 166 and/or midstream sensor 168 can determine whether the nitrogen oxides created during regeneration are above an acceptable level. If the result of the decision step 240 is yes, the controller can, via a instruction step 242, direct or command the exhaust gasses to the N-based SCR catalyst 152. The controller in another introducing step 244 can also direct the N-based SCR injector 156 to introduce additional nitrogen-based reductant agent to the exhaust gasses, either upstream of or directly into the N-based SCR catalyst 152. Because of these steps, another reduction step 246 occurs wherein the amount or concentration of nitrogen oxides in the exhaust gasses is reduced in the N-based SCR catalyst by reaction with the nitrogen-based reduction agent.

Referring to FIG. 2, in another decision step 250, the controller can determine whether regeneration of the HC-SCR catalyst is complete, for example, by analyzing information from the sensors disposed in the exhaust channel. If the result of decision step 250 is no, the controller can return to the introducing step 230 and continue to regenerate the HC-SCR catalyst in the presence of the nitrogen-based reductant agent. If, instead, the result of decision step 250 is that regeneration is complete, the controller can issue or execute an instruction step 252 to cease introducing the nitrogen-based reductant agent and return to the start of the flowchart 200.

INDUSTRIAL APPLICABILITY

As explained above, the disclosure is applicable to regenerating an HC-SCR catalyst using in part a nitrogen-based reductant agent. The disclosure can be employed with any type of machine having a power system associated with an HC-SCR system for reducing nitrogen oxides in the exhaust gasses. Referring to FIGS. 1 and 2, during normal operating conditions of the power system 110, the HC-SCR system 130 can also be operating using readily available fuel from the fuel tank 112 as the hydrocarbon reductant agent. If the controller 160 determines that the HC-SCR catalyst 132 has become deactivated due to sulfur oxide deposits forming on the HC-SCR catalyst material, the controller can execute or perform steps such as those depicted in FIG. 2 to regenerate the HC-SCR catalyst 132 in the presence of nitrogen-based reductant agent from the liquid and/or solid nitrogen-based agent storage tanks 140, 142. The nitrogen-based reductant agent can react as described above to remove sulfur oxides from the material of the HC-SCR catalyst 132 by converting at least a portion of the sulfur oxides to hydrogen sulfides or the like. The reaction may be facilitated in part because of the relatively lower concentration of oxygen in the exhaust gasses that results from the introduction to the exhaust gasses of the nitrogen-based reductant agent.

One possible advantage of the disclosure is that the machine 100 can, under normal conditions, operate the HC-SCR system 130 using readily available hydrocarbon reductant agent and only periodically, i.e., during regeneration which may be performed about every 100 hours for example, use the nitrogen-based reductant agent. This conserves the relatively scarce nitrogen-based reductant agent so that a machine operator only needs to replenish the liquid and/or solid nitrogen-based agent storage tanks 140, 142 during regular service intervals, which may occur, for example, every 100 hours. Another possible advantage is that the HC-SCR catalyst 132 can be regenerated with the nitrogen-based reductant at a relatively lower temperature than without the nitrogen-based reductant agent. This may be in part because the decomposition of the nitrogen-based reductant agent may be an exothermic reaction increasing the heat within the HC-SCR catalyst 132 to assist in formation of the hydrogen sulfides. Regeneration at lower temperatures may help prolong the useful life of the HC-SCR catalyst 132.

Because the creation of additional nitrogen oxides during regeneration of an HC-SCR catalyst in concert with a nitrogen-based reductant agent, such use of the nitrogen-based reductant agents has been contrary to conventional thinking and the above advantages have not been previously realized. To further lessen the effect of nitrogen oxide creation and because the machine 100 is already equipped with liquid and/or solid nitrogen-based agent storage tanks 140, 142, the machine can also include an N-based SCR system 150 downstream of the HC-SCR system 130 that can be operated during regeneration to reduce the newly created nitrogen oxides. In a further embodiment, the controller 160 can be configured to determine whether engine and/or exhaust conditions or characteristics favor use of HC-SCR processing or N-based SCR processing and the controller can selectively operate either SCR process for improved performance. For example, the controller can monitor engine or exhaust temperature, or engine load or speed to determine whether to perform HC-SCR processing or N-based SCR processing.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. All formulas or equations are recited as examples only, and other suitable formulas or equations are contemplated unless clearly indicated otherwise.

I claim:

1. A selective catalytic reduction system for use with a power system, the selective catalytic reduction system comprising:
    an exhaust system in fluid communication with the power system and directing exhaust gasses from the power system;
    an hydrocarbon selective catalytic reduction (HC-SCR) catalyst for hydrocarbon selective catalytic reduction disposed in the exhaust system, the HC-SCR catalyst including a catalytic material for reducing a portion of nitrogen oxides present in the exhaust gasses;
    a nitrogen-based reductant agent storage tank for storing a nitrogen-based reductant agent; and
    a nitrogen-based agent injector disposed in the exhaust system and in fluid communication with the nitrogen-based reductant agent storage tank to introduce the nitrogen-based reductant agent to the exhaust gasses.

2. The selective catalytic reduction system of claim 1, wherein the nitrogen-based reductant agent removes sulfur oxides from the HC-SCR catalyst, the sulfur oxides resulting from exposure of the HC-SCR catalyst to sulfurs in the exhaust gasses.

3. The selective catalytic reduction system of claim 2, further comprising a HC-SCR injector disposed in the exhaust system, the HC-SCR injector introducing a hydrocarbon reductant agent to the exhaust gasses.

4. The selective catalytic reduction system of claim 3, further comprising a nitrogen-based selective catalytic reduction (N-based SCR) system including an N-based SCR catalyst for nitrogen-based selective catalytic reduction.

5. The selective catalytic reduction system of claim 4, wherein the N-based SCR catalyst is configured to effect reduction of nitrogen oxides at a temperature that is lower than a temperature for reduction of nitrogen oxides in the HC-SCR catalyst.

6. The selective catalytic reduction system of claim 1, wherein the nitrogen-based reduction agent is selected from the group consisting of liquid ammonia, solid ammonia, and urea.

7. A method of reducing pollutants in exhaust gasses from a combustion-based power system, the method comprising:
    directing the exhaust gasses from the power system via an exhaust system through a hydrocarbon selective catalytic reduction (HC-SCR) catalyst for hydrocarbon selective catalytic reduction disposed in the exhaust system;
    reducing a portion of nitrogen oxides present in the exhaust gasses via the HC-SCR catalyst; and
    periodically introducing a nitrogen-based reductant agent to the exhaust gasses to remove sulfur oxides from the HC-SCR catalyst.

8. The method of claim 7, further comprising introducing a hydrocarbon reductant agent into the exhaust gasses, the hydrocarbon reductant agent partially responsible for reducing the portion of the nitrogen oxides present in the exhaust gasses by HC-SCR.

9. The method of claim 8, wherein the hydrocarbon reductant agent is introduced more frequently than the nitrogen-based reductant agent.

10. The method of claim 8, wherein the hydrocarbon reductant agent is acquired from a fuel supply for the combustion-based power system.

11. The method of claim 8, wherein the nitrogen-based reduction agent is selected from the group consisting of liquid ammonia, solid ammonia or urea.

12. The method of claim 11, wherein the nitrogen-based reduction agent decomposes to nitrogen oxides and hydrogen.

13. The method of claim 12, wherein removal of the sulfur oxides from the HC-SCR catalyst is accomplished by converting at least a portion of the sulfur oxides and the hydrogen to hydrogen sulfides.

14. The selective catalytic reduction system of claim 1, wherein the nitrogen-based reductant agent is solid ammonia.

* * * * *